(12) United States Patent
Maximov et al.

(10) Patent No.: US 11,704,442 B2
(45) Date of Patent: Jul. 18, 2023

(54) INSTANCE HANDLING OF A TRUSTED EXECUTION ENVIRONMENT

(71) Applicant: Telefonaktiebolaget LM Ericsson (publ), Stockholm (SE)

(72) Inventors: Alexander Maximov, Lund (SE); Bernard Smeets, Dalby (SE); Lina Pålsson, Genarp (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 471 days.

(21) Appl. No.: 17/040,970

(22) PCT Filed: Mar. 27, 2018

(86) PCT No.: PCT/EP2018/057808
§ 371 (c)(1),
(2) Date: Sep. 23, 2020

(87) PCT Pub. No.: WO2019/185126
PCT Pub. Date: Oct. 3, 2019

(65) Prior Publication Data
US 2021/0374262 A1 Dec. 2, 2021

(51) Int. Cl.
*G06F 21/62* (2013.01)
*G06F 21/53* (2013.01)
(Continued)

(52) U.S. Cl.
CPC ............ *G06F 21/629* (2013.01); *G06F 21/53* (2013.01); *G06F 21/572* (2013.01);
(Continued)

(58) Field of Classification Search
CPC ...... G06F 21/629; G06F 21/53; G06F 21/572; G06F 21/602; G06F 21/72; G06F 2221/0751
See application file for complete search history.

(56) References Cited

U.S. PATENT DOCUMENTS 9,577,829 B1  2/2017  Roth et al.
9,584,517 B1  2/2017  Roth et al.
(Continued)

FOREIGN PATENT DOCUMENTS

WO  2016209548 A1  12/2016

OTHER PUBLICATIONS

Summons to Attend oral Proceedings issued Jan. 31, 2022 in connection with European Application No. 17777234.0, 10 pages.
(Continued)

*Primary Examiner* — Ayoub Alata
(74) *Attorney, Agent, or Firm* — Leffler Intellectual Property Law, PLLC

(57) ABSTRACT

There is provided mechanisms for handling instances of a trusted execution environment on an execution platform. The trusted execution environment is associated with a secure cryptoprocessor. The secure cryptoprocessor holds a register. The trusted execution environment is configured to read from and write to the register at a given index i. A method is performed by the trusted execution environment. The method comprises checking, upon start of a new instance of the trusted execution environment, status of the register at the given index i, and wherein, when the register at the given index i has its status set to "undefined", an internal status value is set to a first value, and else, when a value is read from the register at the given index i, the internal status value is set to a second value based on the read value. The method comprises writing the internal status value to the register at the given index i. The method comprises running the new instance. The method comprises, whilst running the new instance, reading a current value from the register at the given index i. The method comprises enabling the new instance to keep running only when the current value equals the internal status value.

22 Claims, 4 Drawing Sheets

(51) Int. Cl.
*G06F 21/57* (2013.01)
*G06F 21/60* (2013.01)
*G06F 21/72* (2013.01)

(52) U.S. Cl.
CPC ............ *G06F 21/602* (2013.01); *G06F 21/72* (2013.01); *G06F 2221/0751* (2013.01)

(56) References Cited

U.S. PATENT DOCUMENTS

| | | | |
|---|---|---|---|
| 11,138,132 | B2 | 10/2021 | Lal et al. |
| 2012/0159184 | A1 | 6/2012 | Johnson et al. |
| 2014/0006711 | A1 | 1/2014 | Xing |
| 2014/0040890 | A1 | 2/2014 | Novak et al. |
| 2015/0033316 | A1 | 1/2015 | Scarlata et al. |
| 2015/0095633 | A1* | 4/2015 | Yao .................. G06F 21/72 713/189 |
| 2015/0244735 | A1 | 8/2015 | Kumar et al. |
| 2016/0149912 | A1 | 5/2016 | Scott-Nash et al. |
| 2016/0380985 | A1 | 12/2016 | Chhabra et al. |
| 2017/0185776 | A1 | 6/2017 | Robinson et al. |
| 2018/0183578 | A1 | 6/2018 | Chakrabarti et al. |
| 2018/0183580 | A1 | 6/2018 | Scarlata et al. |
| 2018/0212966 | A1 | 7/2018 | Costa |
| 2018/0285560 | A1* | 10/2018 | Negi .................. G06F 21/72 |
| 2018/0330092 | A1* | 11/2018 | Sniezek ................ G06F 21/57 |
| 2019/0392117 | A1* | 12/2019 | Viswanathan ........ G06F 21/606 |
| 2020/0175208 | A1* | 6/2020 | Yu .................. H04L 9/3236 |
| 2020/0374262 | A1 | 11/2020 | Hoewisch et al. |
| 2021/0365529 | A1 | 11/2021 | Baldwin et al. |

OTHER PUBLICATIONS

Unknown, "Intel Software Guard Extensions Developer Guide", 2016, XP055876760, retrieved from the Internet Jan. 7, 2022, URL:https://01.org/sites/default/files/documentation/intel_sgx_developer_guide_pdf.pdf, 34 pages.

Mechalas, John P., "Properly Detecting Intel Software Guard Extensions (Intel SGX) in Your Applications", Aug. 8, 2017, XP055876757, retrieved from the internet Jan. 7, 2022, URL:https://www.intel.com/content/www/us/en/developer/articles/technical/properly-detecting-intel-software-guard-extensions-inyour-applications.html, 12 pages.

Notice of Allowance dated Apr. 15, 2022 in connection with U.S. Appl. No. 17/040,625, 22 pages.

PCT International Search Report, dated Nov. 2, 2018, in connection with International Application No. PCT/EP2018/057808, all pages.

PCT Written Opinion, dated Nov. 2, 2018, in connection with International Application No. PCT/EP2018/057808, all pages.

PCT International Search Report, dated Oct. 29, 2018, in connection with International Application No. PCT/EP2018/057807, all pages.

PCT Written Opinion, dated Oct. 29, 2018, in connection with International Application No. PCT/EP2018/057807, all pages.

M. Dalheimer et al., "GenLM: License Management for Grid and Cloud Computing Environments", 9th IEEE/ACM International Symposium on Cluster Computing and the Grid, May 18, 2009, Piscataway, NJ, USA, pp. 132-139.

S. Matetic et al., "ROTE: Rollback Protection for Trusted Execution", accessed Jun. 29, 2017, 19 pages.

PCT International Search Report, dated Jun. 13, 2018, in connection with International Application No. PCT/EP2017/074251, all pages.

PCT Written Opinion, dated Jun. 13, 2018, in connection with International Application No. PCT/EP2017/074251, all pages.

Ahmad Atamli-Reineh et al., "A framework for application partitioning using trusted execution environments", Concurrency and Computation: Practice and Experience, Apr. 23, 2017, Wiley Online Library (wileyonlinelibrary.com), pp. 1-23.

Ming-Wei Shih et al., "S-NFV: Securing NFV states by using SGX", https://taesoo.gtisc.gatech.edu/pubs/2016/shih:snfv.pdf, 2016, 4 pages.

Notice of Allowance dated Apr. 6, 2022 in connection with U.S. Appl. No. 16/642,360, 26 pages.

\* cited by examiner

INSTANCE HANDLING OF A TRUSTED EXECUTION ENVIRONMENT

TECHNICAL FIELD

Embodiments presented herein relate to a method, a trusted execution environment, a computer program, and a computer program product for handling instances of the trusted execution environment on an execution platform.

BACKGROUND

Network equipment and functions performed on such network equipment are increasingly delivered as (micro-) services that are implemented by software that runs on a generic hardware or virtualized hardware platform, using standard platform technologies.

So-called trusted execution environments, such as enclaves, offer the possibility to have services running in hardware owned by the licensee without the licensee being able to extract data from a trusted execution environment when the trusted execution environment is running or when the trusted execution environment is not running and saved for later restart.

But whereas in hardware based platforms there are mechanisms that enable control and/or limitation of the number of instances of a certain program to execute on the platform, any number of instances of an trusted execution environment comprising a (micro-)service might be started on the platform. Only practical limitations, such as memory size limitations, limit the number of concurrent instances of one and the same trusted execution environment.

Thus, since the trusted execution environments generally are started from the operating system which is under control of the licensee, the licensee is enabled to start multiple instances of one and the same trusted execution environment. Even if there is no direct way to make changes to the trusted execution environment state directly from the outside the trusted execution environment, the licensee may gain benefit from starting an additional instance of a trusted execution environment.

Hence, there is still a need for improved handling of instances of a trusted execution environment.

SUMMARY

An object of embodiments herein is to provide efficient handling of instances of a trusted execution environment, that, for example, enables control of how many instances of the trusted execution environment are allowed to be running.

According to a first aspect there is presented a method for handling instances of a trusted execution environment on an execution platform. The trusted execution environment is associated with a secure cryptoprocessor. The secure cryptoprocessor holds a register. The trusted execution environment is configured to read from and write to the register at a given index i. The method is performed by the trusted execution environment. The method comprises checking, upon start of a new instance of the trusted execution environment, status of the register at the given index i, and wherein, when the register at the given index i has its status set to "undefined", an internal status value is set to a first value, and else, when a value is read from the register at the given index i, the internal status value is set to a second value based on the read value. The method comprises writing the internal status value to the register at the given index i. The method comprises running the new instance. The method comprises, whilst running the new instance, reading a current value from the register at the given index i. The method comprises enabling the new instance to keep running only when the current value equals the internal status value.

According to a second aspect there is presented a trusted execution environment for handling instances of the trusted execution environment on an execution platform. The trusted execution environment is associated with a secure cryptoprocessor. The secure cryptoprocessor holds a register. The trusted execution environment is configured to read from and write to the register at a given index i. The trusted execution environment comprises processing circuitry. The processing circuitry is configured to cause the trusted execution environment to check, upon start of a new instance of the trusted execution environment, status of the register at the given index i, and wherein, when the register at the given index i has its status set to "undefined", an internal status value is set to a first value, and else, when a value is read from the register at the given index i, the internal status value is set to a second value based on the read value. The processing circuitry is configured to cause the trusted execution environment to write the internal status value to the register at the given index i. The processing circuitry is configured to cause the trusted execution environment to run the new instance. The processing circuitry is configured to cause the trusted execution environment to, whilst the new instance is run, read a current value from the register at the given index i. The processing circuitry is configured to cause the trusted execution environment to enable the new instance to keep running only when the current value equals the internal status value.

According to a third aspect there is presented a trusted execution environment for handling instances of the trusted execution environment on an execution platform. The trusted execution environment is associated with a secure cryptoprocessor. The secure cryptoprocessor holds a register. The trusted execution environment is configured to read from and write to the register at a given index i. The trusted execution environment comprises a status check module configured to check, upon start of a new instance of the trusted execution environment, status of the register at the given index i, and wherein, when the register at the given index i has its status set to "undefined", an internal status value is set to a first value, and else, when a value is read from the register at the given index i, the internal status value is set to a second value based on the read value. The trusted execution environment comprises a write module configured to write the internal status value to the register at the given index i. The trusted execution environment comprises a run module configured to run the new instance. The trusted execution environment comprises a read module configured to, whilst the new instance is run, read a current value from the register at the given index i. The trusted execution environment comprises an enable running module configured to enable the new instance to keep running only when the current value equals the internal status value.

According to a fourth aspect there is presented a computer program for handling instances of a trusted execution environment on an execution platform, the computer program comprising computer program code which, when run on the trusted execution environment, causes the trusted execution environment to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient handling of instances of the trusted execution environment.

Advantageously this enables running of only one single instance of the trusted execution environment at a time.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
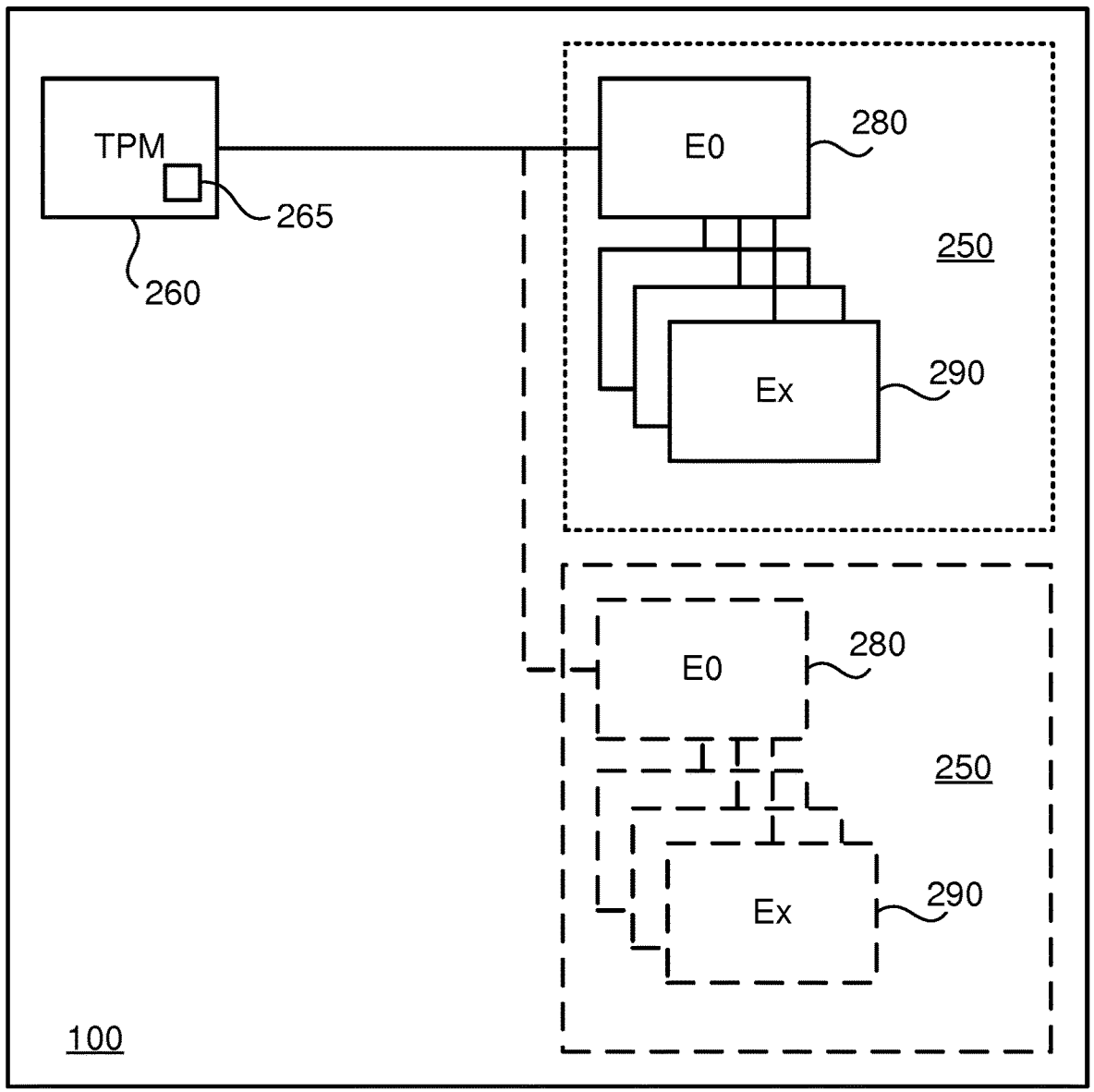
FIG. 1 is a schematic diagram illustrating an execution platform according to embodiments.

FIG. 1 illustrates an execution platform 100 according to an embodiment. The execution platform 100 comprises a secure cryptoprocessor 260 and a trusted execution environment 280. As will be further disclosed below, the secure cryptoprocessor 260 has a memory that holds a register 265. According to an embodiment the secure cryptoprocessor 260 has a volatile storage, and the register 265 is kept at the volatile storage. This enables the content of the register to be rendered "undefined" upon rebooting or power down of the secure cryptoprocessor 260. The register 265 might further have a non-volatile part for holding register status information.

There could be different examples of trusted execution environments 280. According to an embodiment the trusted execution environment 280 is a base enclave (Eo) of an enclave environment 250. The term enclave as used herein could be regarded as short for hardware-mediated execution enclave. The enclave environment 250 might comprise several enclaves. Only a single enclave, denoted base enclave (Eo), in the enclave environment might then be enabled to communicate with the secure cryptoprocessor 260. There could be different examples of secure cryptoprocessor 260. According to an embodiment the secure cryptoprocessor 260 is a trusted platform module (TPM).

The trusted execution environment 280 might generally be defined as an area of process space and memory within a system environment, such as an execution platform 100, within a computer host which delivers confidentiality and integrity of instructions and data associated with that enclave. This trusted execution environment 280 is protected from eavesdropping, replay and alteration attacks as the programs within the enclave are executed. A trusted execution environment 280 is considered capable of executing processes, and executable code can be loaded into it. Various capabilities may be provided by such a trusted execution environment, but at minimum, the following might be enabled: the ability for executable software to be loaded into the trusted execution environment 280, the ability for the host to attest to the integrity of the executable code prior to execution, and the ability to load data into the trusted execution environment 280. The ability to execute software within the trusted execution environment 280 without other processes on the computer host being able to inspect, alter or replay the instructions or associated data. Note that these protections are not just against unprivileged processes, but also against the secure cryptoprocessor 260 and hypervisor processes which may be running at an escalated privilege level.

In general terms, secure cryptoprocessor 260 might be defined as a hardware cryptographic module that is enabled to securely store sensitive data and perform various cryptographic operations. Authentication (a process to prove the identity attribute of an entity, i.e. the secure cryptoprocessor 260 acting as the integrity reporting entity) and attestation (a process that enables the software integrity state to be reported and verified in order to determine its trustworthiness) are some steps that might be performed to ensure trusted computing. A secure cryptoprocessor 260 can authenticate itself using the credentials stored in shielded memory and provide integrity measurements reports to prove that software is trustworthy. The nature of the secure cryptoprocessor's 260 shielded memory ensures that information may be stored and protected from external software attacks. A variety of applications storing data and secrets protected by a secure cryptoprocessor 260 can be developed. These applications make it much harder to access information on a computing platform without proper authorization. If the software configuration of a platform has changed as a result of unauthorized activities, access to such data and secrets can be denied. Various secure cryptoprocessor specifications exist. Secure cryptoprocessors 260 can provide a hardware root of trust on a hosting service platform, and can be leveraged for operations such as measured boot and attestation.

Assume a secure cryptoprocessor 260 having a register, where the register at a given index i can hold a value "X".

When the secure cryptoprocessor 260 is operational, the register is kept in the volatile storage of the secure cryptoprocessor 260, such as in the RAM of the secure cryptoprocessor 260, meaning that its contents is lost when power goes down or when a reboot occurs. After a reboot the value of the register becomes "undefined", but the allocation of the register and attached properties survive the power cycles of the platform, including the power cycle of the secure cryptoprocessor 260.

Assume further that the trusted execution environment 280 has the capability to recognize when the value of the register at the given index i is "undefined" or "defined", and in the latter case the trusted execution environment 280 can read the current value "X" of the register at the given index i.

When the register is allocated in the secure cryptoprocessor 260 during a bootstrapping and/or migration process, then the trusted execution environment 280 in some aspects is configured to internally generate a random authorization key, denoted K, which is then attached to the security properties of the register at the given index i in the secure cryptoprocessor 260. Alternatively, the secure cryptoprocessor 260 might be configured to internally generate the authorization key K and then share it with the trusted execution environment 280 in a secure manner. This is one way These are two ways to guarantee that only the correct trusted execution environment 280 can read and write to the register at the given index i.

In case of TPM 2.0 (i.e., TPM revision version 2.0), the bootstrapping process implies that the trusted execution environment 280 should allocate space in a memory holding the register at the given index i with the following flags:

Setting the TPMA_NV_ORDERLY flag implies that a non-volatile part of the memory will be written to only if a normal shutdown process is performed in secure cryptoprocessor 260, and it will not be written to when the register at the given index i is actually written or in case execution of the secure cryptoprocessor 260 crashes. This prevents wear-out of the memory holding the register.

Setting the TPMA_NV_CLEAR_STCLEAR flag makes the register at the given index i be set to "undefined" after the secure cryptoprocessor 260 is rebooted, which means that even in normal shutdown there will be no writes to the register at all, but rather a volatile status flag will be flushed to "undefined" state.

Setting the TPMA_NV_AUTHREAD flag or TPMA_NV_AUTHWRITE flag dictates that the register may be written to or be read from only when the authorization key K is known to the writing entity, such as the trusted execution environment 280, using an HMAC SESSION. This prevents other unauthorized entities to modify the register at the given index i or even to read its content.

Setting the TPMA_NV_POLICYREAD flag or the TPMA_NV_POLICYWRITE flag makes it possible to use a POLICY SESSION, where, if the AuthPolicy type is added, requires the user to know the authorization key K. However, other policy branches may be added for, e.g., an acute situation that may allow a third party entity to assist externally predefined situations.

The above mentioned flags are examples of register status information that might be held in the non-volatile part of the register 265.

Allocation of the memory space for the register at the given index i requires the knowledge of the owner authorization of the secure cryptoprocessor 260, and this authorization is assumed to be known to the trusted execution environment 280 (and, optionally, known to the public usage of the secure cryptoprocessor 260). In other aspects the entity that performs a remote bootstrapping may know the owner authorization and may thus perform the allocation of the memory space remotely, using the trusted execution environment 280 as a communication proxy to the secure cryptoprocessor 260.

When allocating the memory space for the register at the given index i the authorization key K and (optionally) the policy digest are attached to the register at the given index i. Those properties are thereby persistent and can survive power cycles of the secure cryptoprocessor 260.

With the above flags (ORDERLY and STCLEAR), the allocated memory space in the secure cryptoprocessor 260 will never be written, and becomes "undefined" after the reboot of the secure cryptoprocessor 260.

The authorization key K might be checked in an HMAC or POLICY session by the secure cryptoprocessor 260 when memory space is written to or being read from. However, checking whether the content of the register at the given index i is "defined" or "undefined" might not require the knowledge of the authorization key K. Therefore, an additional check of the authorization key K can be made when the content of the register at the given index i is updated. In other aspects a check of the authorization key K is mandatory when updating the content of the register at the given index i.

The failure to read from or write to the memory space could imply that (i) the trusted execution environment 280 is trying to use a wrong authorization key K (i.e., wrong trusted execution environment 280), that (ii) the secure cryptoprocessor 260 does not know the private portion of the encryption key corresponding to the public portion of the encryption key (such as a Storage Root Key) that is known to the trusted execution environment 280 and used for derivation of a secure session key (i.e., wrong secure cryptoprocessor 260), that (iii) the memory space as been redefined by another entity (i.e., memory space security settings are re-defined), that (iv) the memory space was removed by another entity (e.g. during a Denial of Service attack), or that (v) bootstrapping of the secure cryptoprocessor 260 has not been performed.

The embodiments disclosed herein relate to mechanisms for handling instances of the trusted execution environment 280 on an execution platform 100. In order to obtain such mechanisms there is provided a trusted execution environment 280, a method performed by the trusted execution environment 280, a computer program product comprising code, for example in the form of a computer program, that when run on a trusted execution environment 280, causes the trusted execution environment 280 to perform the method.

Figure 2:
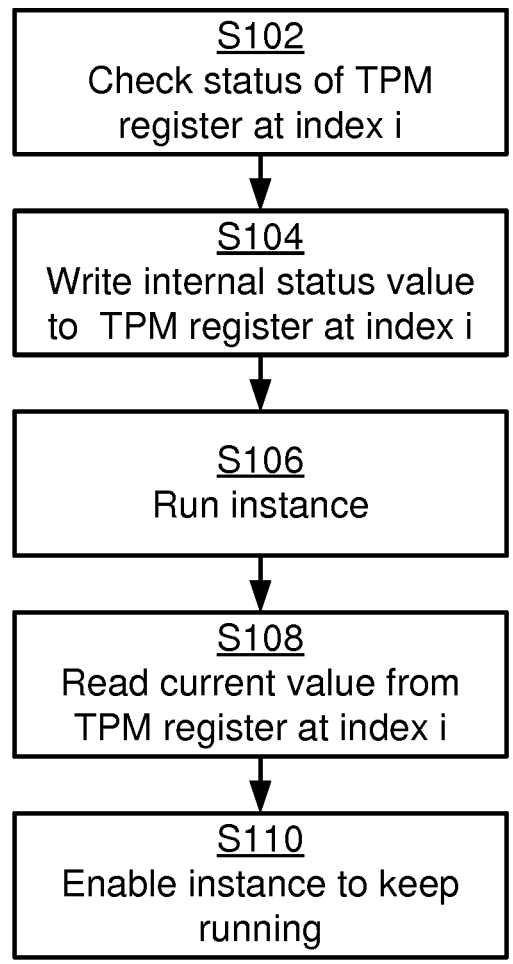
FIG. 2 is a flowchart of methods according to embodiments.

FIG. 2 is a flowchart illustrating embodiments of methods for handling instances of the trusted execution environment 280 on an execution platform 100. The methods are performed by the trusted execution environment 280. The methods are advantageously provided as computer programs 720.

Figure 3:
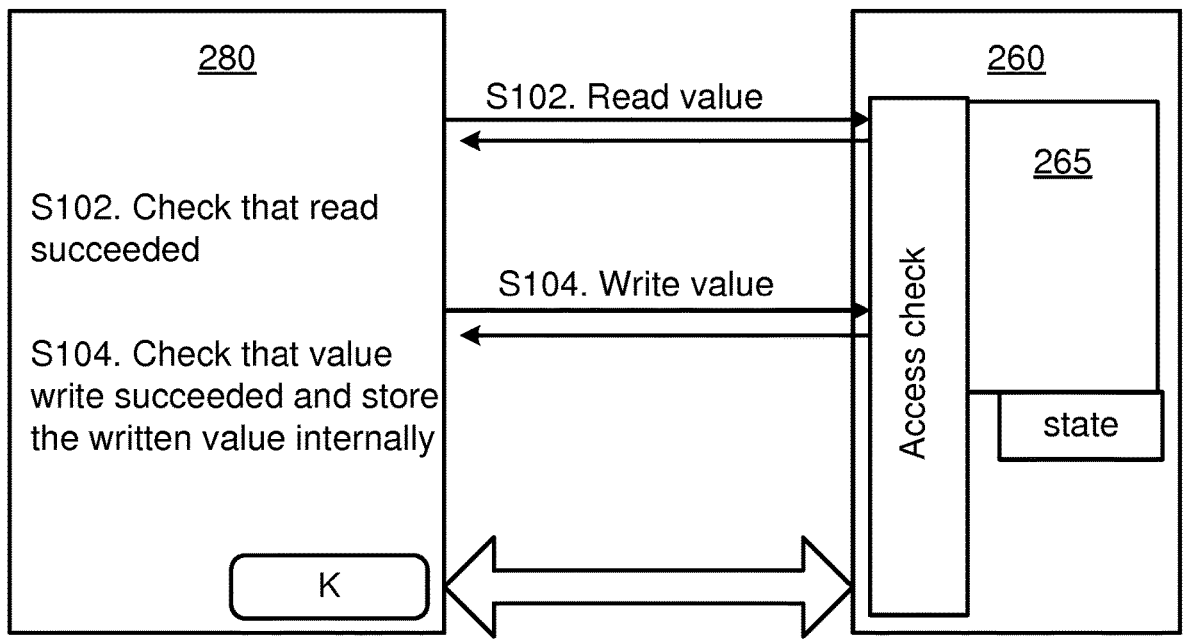
FIGS. 3 and 4 schematically illustrate communication between a secure cryptoprocessor and a trusted execution environment according to embodiments.
Figure 4:
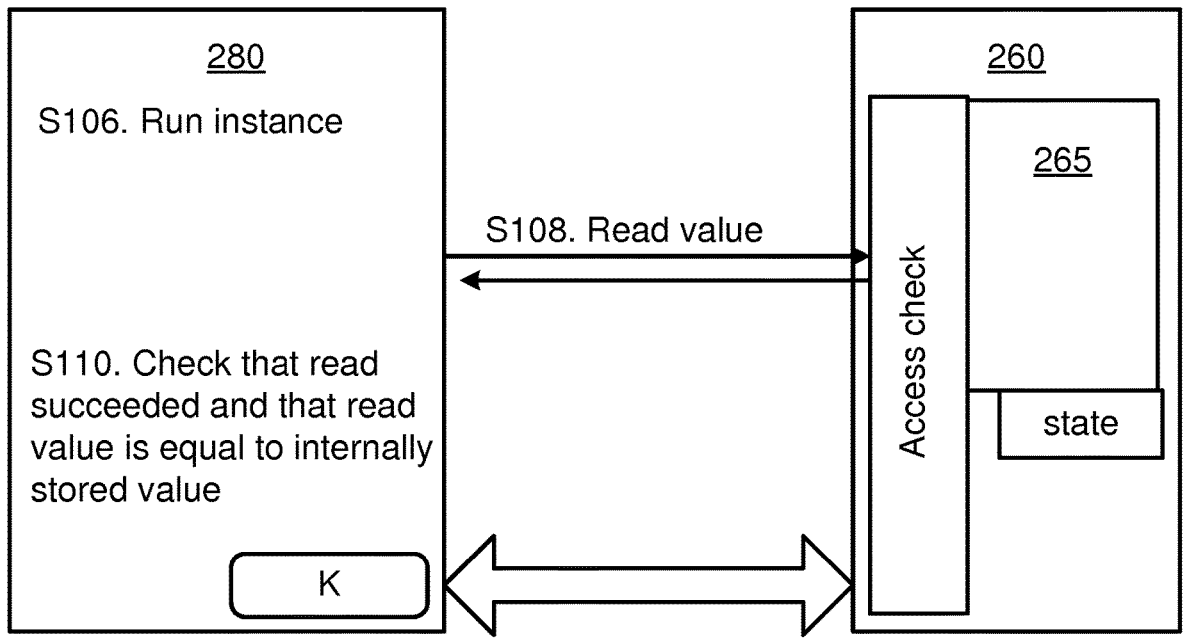

The trusted execution environment 280 is associated with a secure cryptoprocessor 260. The secure cryptoprocessor 260 holds a register 265. The trusted execution environment 280 is configured to read from and write to the register 265 at a given index i. Parallel reference is made to FIGS. 3 and 4 illustrating the interaction between the trusted execution environment 280 and the secure cryptoprocessor 260. It is in the illustrative examples of FIGS. 3 and 4 illustrated that the register 265 has a state and that the trusted execution environment 280 holds an authorization key K that is checked by an access check module at the secure cryptoprocessor 260 in order for the trusted execution environment 280 to be able to read from and write to the register 265 at the given index i.

When a new instance of the trusted execution environment 280 is started, the trusted execution environment 280 checks the status of the register 265 at the given index i. Hence, the trusted execution environment 280 is configured to perform step S102:

S102: The trusted execution environment 280 checks, upon start of a new instance of the trusted execution environment 280, status of the register 265 at the given index i. When the register 265 at the given index i has its status set to "undefined", an internal status value (denoted "v") is set to a first value. Else, when a value (denoted "X") is read from the register 265 at the given index i (and thus the register 265 at the given index i has its status set to "defined"), the internal status value is set to a second value, where the second value is based on the read value. The internal value might be kept in the trusted execution environment 280. For example the first value might be 0 and thus v is set to v=0 when the register 265 at the given index i has its status set to "undefined".

The trusted execution environment 280 then writes to the register 265 at the given index i the value v. Hence, the trusted execution environment 280 is configured to perform step S104:

S104: The trusted execution environment 280 writes the internal status value to the register 265 at the given index i. That is, X is set to X=v.

The instance of the trusted execution environment 280 is then run. Particularly, the trusted execution environment 280 is configured to perform step S106:

S106: The trusted execution environment 280 runs the new instance.

The trusted execution environment 280 then, whilst running the new instance, occasionally reads a current value from the register 265 at the given index i. Hence, the trusted execution environment 280 is configured to perform step S108:

S108: The trusted execution environment 280, whilst running the new instance, reads a current value from the register 265 at the given index i.

It is then checked by the trusted execution environment 280 that the current value as read in step S108 is identical to the value that was written to the same register 265 at the same given index i in step S104. Particularly, the trusted execution environment 280 is configured to perform step S110:

S110: The trusted execution environment 280 enables the new instance to keep running only when the current value equals the internal status value.

Thus, if the read current value is not the same as the written value then any further operation of the trusted execution environment 280 is stopped or blocked.

Thereby, only the latest started instance of the trusted execution environment 280 will survive and execute; the execution of all previous instances will eventually stop. In case the trusted execution environment 280 crashes then starting a new instance will be permitted without a need to reboot the whole execution platform 100. In case the execution platform 100 crashes then all instances of the trusted execution environment 280 will be terminated and the register 265 of the secure cryptoprocessor 260 becomes "undefined".

Embodiments relating to further details of handling instances of the trusted execution environment 280 on an execution platform 100 as performed by the trusted execution environment 280 will now be disclosed.

There may be different ways to base the second value on the read value. For example, the second value could be a function of the read value, where the function specifies that the second value is equal to the read value as added by a constant, as subtracted by a constant, or be selected according to any specified ordered sequence of values. According to an embodiment the second value equals the read value increased by one unit.

In some aspects the interval value is kept in a volatile storage of the trusted execution environment 280 and will thus only live during the lifetime of the instance and will never be loaded from outside the trusted execution environment 280. Hence, according to an embodiment the internal status value is reset upon start of the new instance.

There could be different ways for the trusted execution environment 280 to act if the status of the register 265 at the given index i is "defined" and the trusted execution environment 280 fails to read any value from the register 265 at the given index i in step S102. In some aspects any further operation by the instance of the trusted execution environment 280 is stopped or blocked. That is, according to an embodiment the new instance is prevented from keep running when not being authorized to read the value from the register (265) at the given index i.

There could be different ways for the trusted execution environment 280 to act if writing to the register 265 at the given index i in step S104 fails. In some aspects any further operation by the instance of the trusted execution environment 280 is stopped or blocked. That is, according to an embodiment the new instance is prevented from keep running when unable to write the second value to the register (265) at the given index i.

There could be different ways for the trusted execution environment 280 to be configured with regards to when, or how often, in time to read the current value from the register 265 at the given index i in step S108. In some aspects the trusted execution environment 280 is configured to read the current value timely (for example, once every minute, once every 10 seconds, etc.), or before specific functionality is called by a host application run on the trusted execution environment 280 or by a user of the trusted execution environment 280. That is, according to an embodiment when the current value is read is either time-driven or event-driven.

There could be different ways for the trusted execution environment 280 to act if the trusted execution environment 280 fails to read any value from the register 265 at the given index i in step S108. In some aspects any further operation by the instance of the trusted execution environment 280 is stopped or blocked. That is, according to an embodiment the new instance is prevented from keep running when not being authorized to read the current value from the register 265 at the given index i.

As disclosed above, in some aspects the trusted execution environment 280 has access to an authorization key K. According to an embodiment, reading from and writing to the register 265 at the given index i is then only possible upon the authorization key K being checked by the secure cryptoprocessor 260. As will be further disclosed below, the authorization key K might be checked in an HMAC session or a POLICY session. The authorization key K might be random-valued and generated internally by the trusted execution environment 280.

In some aspects a secure session is created between the trusted execution environment 280 and the secure cryptoprocessor 260 so that information can be shared between them with integrity protection and privacy protection. Thus, according to an embodiment a secure session is established between the trusted execution environment 280 and the secure cryptoprocessor 260 in conjunction with starting the new instance of the trusted execution environment 280.

In some aspects it is assumed that after bootstrapping (see below) the trusted execution environment 280 knows a public key associated with the secure cryptoprocessor 260 for which the secure cryptoprocessor 260 holds the corresponding private key. Hence, according to an embodiment the trusted execution environment 280 is provided information about the given index i during bootstrapping of the trusted execution environment 280. A secure session can then be established, e.g. by using a random salt value, generated on the trusted execution environment side and encrypted by the public key of the secure cryptoprocessor 260, such that only the correct secure cryptoprocessor 260 can decrypt the salt and derive the session key to, which is to be used during the secure session, out of it.

In some aspects, while deriving the session key both the trusted execution environment 280 and the secure cryptoprocessor 260 may use randomly generated nonces. In this way the trusted execution environment 280 and the secure cryptoprocessor 260 can mitigate replay attacks as well.

The above way to establish the secure session ensures that the trusted execution environment 280 is communicating with the correct secure cryptoprocessor 260.

In some aspects it is assumed that after bootstrapping the trusted execution environment 280 also knows a secret (as defined by the authorization key K) that enables the trusted execution environment 280 to access certain registers of the secure cryptoprocessor 260 (such as the register at the given index i).

An illustrative example for establishing the secure session in case of using TPM 2.0 will now be provided.

Step 1: The trusted execution environment 280 has access to the correct public portion of the Storage Root Key (SRK) of the correct secure cryptoprocessor 260.

Step 2: The trusted execution environment 280 obtains initial connectivity to the secure cryptoprocessor 260. The initial connectivity is provided by, e.g., a host OS, a host application, BIOS, or by other means.

Step 3: The trusted execution environment 280 starts a new SESSION where the proof of possession of the secure cryptoprocessor 260 is inherited as will be disclosed next.

The trusted execution environment 280 generates a random salt and encrypts it by using the public portion of key in the secure cryptoprocessor 260 (e.g. the SRK). Thereby only the correct secure cryptoprocessor 260 is enabled to decrypt the salt and then derive the SESSION key. In this way the trusted execution environment 280 and the secure cryptoprocessor 260 establish a secure session where the trusted execution environment 280 is ensured to communicate with the correct secure cryptoprocessor 260, albeit via an untrusted channel.

The secure session depends on nonces from the trusted execution environment 280 and the secure cryptoprocessor 260. These nonces are randomly and independently selected by the trusted execution environment 280 and the secure cryptoprocessor 260. This prevents a replay attack.

The secure session can be either a HMAC session or a POLICY session (in terms of TPM 2.0).

In case an HMAC session or POLICY session is requested by the trusted execution environment 280, the trusted execution environment 280 uses the pre-defined authorization key K when access resources of the secure cryptoprocessor 260 (e.g. NVRAM area), thus enabling mutual checks between the secure cryptoprocessor 260 and the trusted execution environment 280.

In case a POLICY session is requested by the trusted execution environment 280, then an External Authority might be configured to restore/repair the secure session.

Step 4: The trusted execution environment 280 and the secure cryptoprocessor 260 each derives the SESSION key on their sides. The subsequent traffic between the secure session during the secure session is then encrypted with the SESSION key.

Step 5: The secure session is closed after the trusted execution environment 280 completes the needed TPM commands.

In case an HMAC session is ongoing the trusted execution environment 280 can perform a number of TPM commands using the same session instance.

In case a POLICY session is ongoing the trusted execution environment 280 closes the secure session after the policy has been used for a single TPM command.

If using a platform where the trusted execution environment 280 can have direct integrity and privacy protected communication with the secure cryptoprocessor 260, no proof of possession of the secure cryptoprocessor 260 is needed and then the SRK does not need to be used. Instead the communication is automatically secured through the platform architecture. HMAC or POLICY types of sessions can still be used by the trusted execution environment 280 to proof its knowledge of the authorization key K in order for the trusted execution environment 280 to be authorized to perform actions on a resource (such as memory space) of a certain secure cryptoprocessor 260.

The trusted execution environment 280 might have a local secure storage in a form of an encrypted file that can only be decrypted by that trusted execution environment 280. Intel SGX provides an operation called for "sealing" and any data may be sealed to that certain trusted execution environment 280. If there is no local storage then a remote entity may provide the decryption key for the unseal operation.

Particularly, according to an embodiment the trusted execution environment 280 has access to encrypted and integrity-protected data, the data representing at least one of: information about the given index i, the authorization key K for reading from and writing to the register 265 at the given index i, and a public key of the secure cryptoprocessor 260. The sealed data that the trusted execution environment 280 stores might thus comprise any of the following information: (i) the register identifier of the secure cryptoprocessor 260 (e.g., the value of the given index i), (ii) the authorization key K, and (iii) the public key of the secure cryptoprocessor 260 for establishing the secure session. The latter is only needed in case the channel between trusted execution environment 280 and secure cryptoprocessor 260 is not trusted. The sealed data might be stored as a sealed blob. When the sealed blob is not found, then a bootstrapping process might be performed, where the above information should be provisioned, derived, or generated in a trustworthy way. Otherwise, the running instance of the trusted execution environment 280 instance should freeze its operation or terminate.

In general terms, migration of the trusted execution environment 280 to another platform implies that there will be a new secure cryptoprocessor 260 at the destination platform. The information in the sealed blob then needs to be re-created, and, therefore, this process may be described as a bootstrapping process, except that the register at the source platform needs to be released and a new register at the destination secure cryptoprocessor 260 with, perhaps, a new given index i, will be allocated. That is, according to an embodiment new values of the data are generated upon migration of the trusted execution environment 280 to another execution platform 100.

Depending on the scenario, the bootstrapping in general should be performed by a trusted launch authority (TLA) which could be the owner of the trusted execution environment 280, a third-party entity that the trusted execution environment 280 owner trusts. Alternatively, the source trusted execution environment 280 itself could serve as TLA with respect to the destination trusted execution environment 280.

The TLA might be configured to perform a remote attestation of the destination platform, the destination "empty" trusted execution environment 280 and, optionally, attest the public key of the secure cryptoprocessor 260 (such as the public portion of SRK in case of TPM), that exists only in that certain secure cryptoprocessor 260.

The TLA might be configured to check the trustworthiness of that public key by using an attestation process, or by verifying the corresponding chain of certificates, or by other means. Afterwards, the TLA delivers the trusted public portion of the key of the secure cryptoprocessor 260 to the trusted execution environment 280, which is then used by the trusted execution environment 280 to establish a secure channel to the secure cryptoprocessor 260.

The TLA or the trusted execution environment 280 might be configured to then establish a secure channel to the secure cryptoprocessor 260 in order to perform the remaining parts of bootstrapping actions. The TLA or the trusted execution environment 280 might be configured to internally generate the authorization key K, and a new register at the given index is then allocated, where the authorization key K and, optionally, an agreed policy are attached to the given index i. The given index i itself may be a fixed value, or it can be dynamically allocated by the secure cryptoprocessor 260.

The trusted execution environment 280 might seal the new data into a file and then perform a normal start procedure as of described above.

Other steps that might be performed during the bootstrapping procedure are left so as to not obscure the present disclosure.

If the SRK is not already created in the secure cryptoprocessor 260, it can be created when needed in an "on-demand" fashion as a primary key with well-defined set of parameters. Also, the SRK may be made persistent in secure cryptoprocessor 260 such that it does not have to be created every time a secure channel needs to be established.

When the trusted execution environment 280 (or an external entity) receives the SRK public key, its certificate might be checked, to ensure that the SRK public key comes from a trusted secure cryptoprocessor 260. This can be achieved in several ways.

According to a first example, the trusted execution environment 280 only knows the constant signing public key of the manufacturer of the secure cryptoprocessor 260 and checks the signature of the SRK public key.

According to a second example, the SRK could be verified through quoting/attestation using an endorsement key (EK) or other attestation key from the secure cryptoprocessor 260, whose trustworthiness can be checked by the endorsement, i.e., EK certificate which was signed by the manufacturer of the secure cryptoprocessor 260 carrying the public keys of EK.

After the trusted execution environment 280 accepted the SRK, and stores the SRK public key, the trusted execution environment 280 can thereafter create secure sessions, for start/stop operations as well as to allocate and deallocate the given index i.

Figure 5:
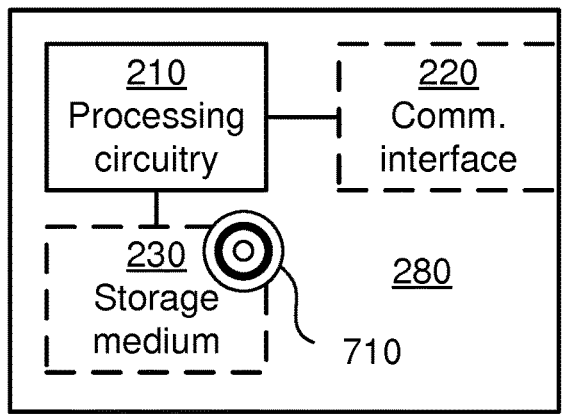
FIG. 5 is a schematic diagram showing functional units of a trusted execution environment according to an embodiment.

FIG. 5 schematically illustrates, in terms of a number of functional units, the components of a trusted execution environment 280 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the trusted execution environment 280 to perform a set of operations, or steps, as disclosed above. For example, the storage medium 230 may store the set of operations, and the processing circuitry 210 may be configured to retrieve the set of operations from the storage medium 230 to cause the trusted execution environment 280 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The trusted execution environment 280 may further comprise a communications interface 220 at least configured for communications with other entities, nodes, functions, and devices, such as the secure cryptoprocessor 260. As such the communications interface 220 may comprise one or more transmitters and receivers, comprising analogue and digital components. The processing circuitry 210 controls the general operation of the trusted execution environment 280 e.g. by sending data and control signals to the communications interface 220 and the storage medium 230, by receiving data and reports from the communications interface 220, and by retrieving data and instructions from the storage medium 230. Other components, as well as the related functionality, of the trusted execution environment 280 are omitted in order not to obscure the concepts presented herein.

Figure 6:
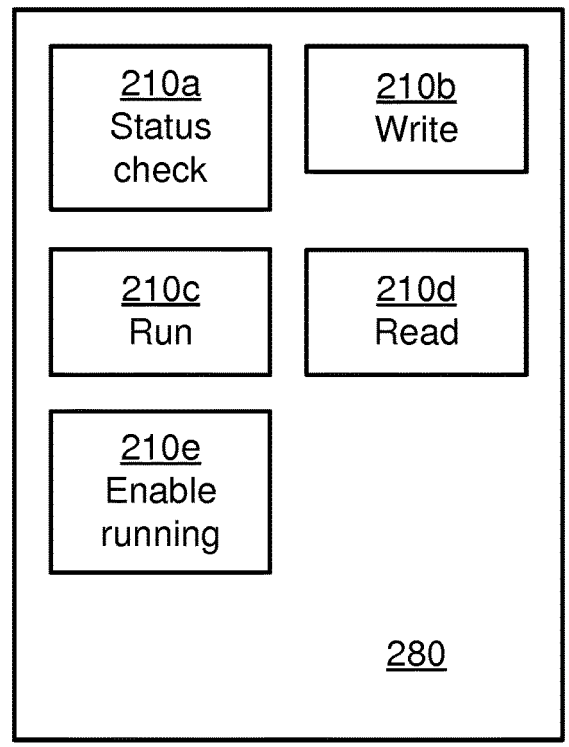
FIG. 6 is a schematic diagram showing functional modules of a trusted execution environment according to an embodiment.

FIG. 6 schematically illustrates, in terms of a number of functional modules, the components of a trusted execution environment 280 according to an embodiment. The trusted execution environment 280 of FIG. 6 comprises a number of functional modules; a status check module 210a configured to perform step S102, a write module 210b configured to perform step S104, a run module 210c configured to perform step S208, a read module 210d configured to perform step S108, and an enable running module 210e configured to perform step S110. The trusted execution environment 280 of FIG. 6 may further comprise a number of optional functional modules (not shown). In general terms, each functional module 210a-210e may in one embodiment be implemented only in hardware and in another embodiment with the help of software, i.e., the latter embodiment having computer program instructions stored on the storage medium 230 which when run on the processing circuitry makes the trusted execution environment 280 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

Figure 7:
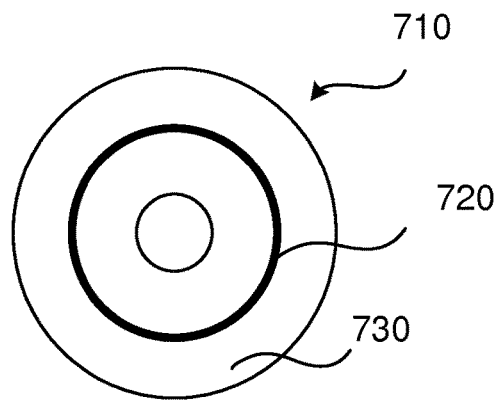
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling instances of a trusted execution environment on an execution platform, the trusted execution environment being associated with a secure cryptoprocessor, wherein the secure cryptoprocessor holds a register, and wherein the trusted execution environment is configured to read from and write to the register at a given index i, the method being performed by the trusted execution environment, the method comprising:
   checking, upon start of a new instance of the trusted execution environment, status of the register at the given index i, and wherein, when the register at the given index i has its status set to "undefined", an internal status value is set to a first value, and else, when a value is read from the register at the given index i, the internal status value is set to a second value based on the read value;
   writing the internal status value to the register at the given index i;
   running the new instance, and whilst doing so:
      reading a current value from the register at the given index i; and
      enabling the new instance to keep running only when the current value equals the internal status value.

2. The method according to claim 1, wherein the second value equals the read value increased by one unit.

3. The method according to claim 1, wherein the internal status value is reset upon start of the new instance.

4. The method according to claim 1, wherein the new instance is prevented from keep running when not being authorized to read the value from the register at the given index i.

5. The method according to claim 1, wherein the new instance is prevented from keep running when unable to write the second value to the register at the given index i.

6. The method according to claim 1, wherein when the current value is read is either time-driven or event-driven.

7. The method according to claim 1, wherein the new instance is prevented from keep running when not being authorized to read the current value from the register at the given index i.

8. The method according to claim 1, wherein the trusted execution environment has access to an authorization key, K, and wherein reading from and writing to the register at the given index i is only possible upon the authorization key K being checked by the secure cryptoprocessor.

9. The method according to claim 8, wherein the authorization key K is checked in a HMAC or POLICY session.

10. The method according to claim 8, wherein the authorization key K is random-valued and generated internally by the trusted execution environment.

11. The method according to claim 1, wherein the secure cryptoprocessor has a volatile storage, and wherein the register is kept at the volatile storage.

12. The method according to claim 1, wherein a secure session is established between the trusted execution environment and the secure cryptoprocessor in conjunction with starting the new instance.

13. The method according to claim 1, wherein the trusted execution environment is provided information about the given index i during bootstrapping of the trusted execution environment.

14. The method according to claim 1, wherein the trusted execution environment has access to encrypted and integrity-protected data, the data representing at least one of: information about the given index i, an authorization key, K, for reading from and writing to the register at the given index i, and a public key of the secure cryptoprocessor.

15. The method according to claim 14, wherein new values of the data are generated upon migration of the trusted execution environment to another execution platform.

16. The method according to claim 1, wherein the register further has a non-volatile part for holding register status information.

17. The method according to claim 1, wherein the trusted execution environment is a base enclave, E0, of an enclave environment.

18. The method according to claim 1, wherein the secure cryptoprocessor is a trusted platform module (TPM).

19. A trusted execution environment for handling instances of the trusted execution environment on an execution platform, the trusted execution environment being associated with a secure cryptoprocessor, wherein the secure cryptoprocessor holds a register, and wherein the trusted execution environment is configured to read from and write to the register at a given index i, the trusted execution environment comprising processing circuitry, the processing circuitry being configured to cause the trusted execution environment to:

check, upon start of a new instance of the trusted execution environment, status of the register at the given index i, and wherein, when the register at the given index i has its status set to "undefined", an internal status value is set to a first value, and else, when a value is read from the register at the given index i, the internal status value is set to a second value based on the read value;

write the internal status value to the register at the given index i;

run the new instance;

read, whilst the new instance is run, a current value from the register at the given index i; and enable the new instance to keep running only when the current value equals the internal status value.

20. A computing system comprising:

one or more processors; and a memory, wherein the one or more processors and the memory are configured together as a trusted execution environment for handling instances of the trusted execution environment on an execution platform, the trusted execution environment being associated with a secure cryptoprocessor, wherein the secure cryptoprocessor holds a register and wherein the trusted execution environment is configured to read from and write to the register at a given index i, the trusted execution environment comprising:

a status check module implemented in hardware or in a combination of hardware and software, wherein the status check module is configured to check, upon start of a new instance of the trusted execution environment, status of the register at the given index i, and wherein, when the register at the given index i has its status set to "undefined", an internal status value is set to a first value, and else, when a value is read from the register at the given index i, the internal status value is set to a second value based on the read value;

a write module implemented in hardware or in a combination of hardware and software, wherein the write module is configured to write the internal status value to the register at the given index i;

a run module implemented in hardware or in a combination of hardware and software, wherein the run module is configured to run the new instance;

a read module implemented in hardware or in a combination of hardware and software, wherein the read module is configured to, whilst the new instance is run, read a current value from the register at the given index i; and an enable running module implemented in hardware or in a combination of hardware and software, wherein the enable running module is configured to enable the new instance to keep running only when the current value equals the internal status value.

21. The trusted execution environment according to claim 19, wherein the second value equals the read value increased by one unit.

22. A non-transitory computer readable medium for handling instances of a trusted execution environment on an execution platform, the trusted execution environment being associated with a secure cryptoprocessor, wherein the secure cryptoprocessor holds a register, and wherein the trusted execution environment is configured to read from and write to the register at a given index i, the non-transitory computer readable medium comprising computer code which, when run on processing circuitry of the trusted execution environment, causes the trusted execution environment to:

check, upon start of a new instance of the trusted execution environment, status of the register at the given index i, and wherein, when the register at the given index i has its status set to "undefined", an internal status value is set to a first value, and else, when a value is read from the register at the given index i, the internal status value is set to a second value based on the read value;

write the internal status value to the register at the given index i;

run the new instance, and whilst doing so:

read a current value from the register at the given index i; and enable the new instance to keep running only when the current value equals the internal status value.

* * * * *